United States Patent [19]

Huber

[11] Patent Number: 4,651,522
[45] Date of Patent: Mar. 24, 1987

[54] GAS TURBINE ENGINE WITH PULVERIZED COAL FIRING

[76] Inventor: Jakob Huber, Les Aveneyres 8, CH-1806 St-Legier, Switzerland

[21] Appl. No.: 837,369

[22] Filed: Mar. 7, 1986

Related U.S. Application Data

[62] Division of Ser. No. 613,023, May 22, 1984, Pat. No. 4,592,199.

[30] Foreign Application Priority Data

Jun. 6, 1983 [CH] Switzerland ............ 3082/83

[51] Int. Cl.⁴ .............................................. F02C 3/26
[52] U.S. Cl. ............................... 60/226.1; 60/39.092; 60/39.464
[58] Field of Search ............ 60/39.092, 39.464, 226.1, 60/226.3, 262; 415/121 G

[56] References Cited

U.S. PATENT DOCUMENTS

| | | | |
|---|---|---|---|
| 2,187,627 | 1/1940 | Noack | 60/39.464 |
| 2,288,734 | 7/1942 | Noack | 60/39.464 |
| 4,265,646 | 5/1981 | Weinstein et al. | 60/39.092 |
| 4,463,552 | 8/1984 | Monhardt et al. | 60/39.092 |

FOREIGN PATENT DOCUMENTS 640104  7/1950  United Kingdom ........... 415/121 G

Primary Examiner—Louis J. Casaregola
Attorney, Agent, or Firm—Burns, Doane, Swecker & Mathis

[57] ABSTRACT

In order to be able to run a gas turbine engine with pulverized coal as fuel on an industrial basis an arrangement is provided for utilizing the energy contained in the bypass flow with the help of which the solid combustion particles in the combustible gas are removed prior to its entry to the gas turbine blading. If the engine is used for an aircraft this arrangement consists of a thrust nozzle impinged upon by the bypass flow which augments the action of the main thrust nozzle. For use in a stationary power plant this arrangement consists of a heat exchanger in which the heat of the bypass flow is utilized. Thus no unused energy gets lost by way of the bypass flow, so that the heat exchanger need not be kept extremely small for economic reasons. The result is a well cleaned combustible gas and the blades of the gas turbine are to a large extent protected from erosion caused by combustible residues.

5 Claims, 1 Drawing Figure

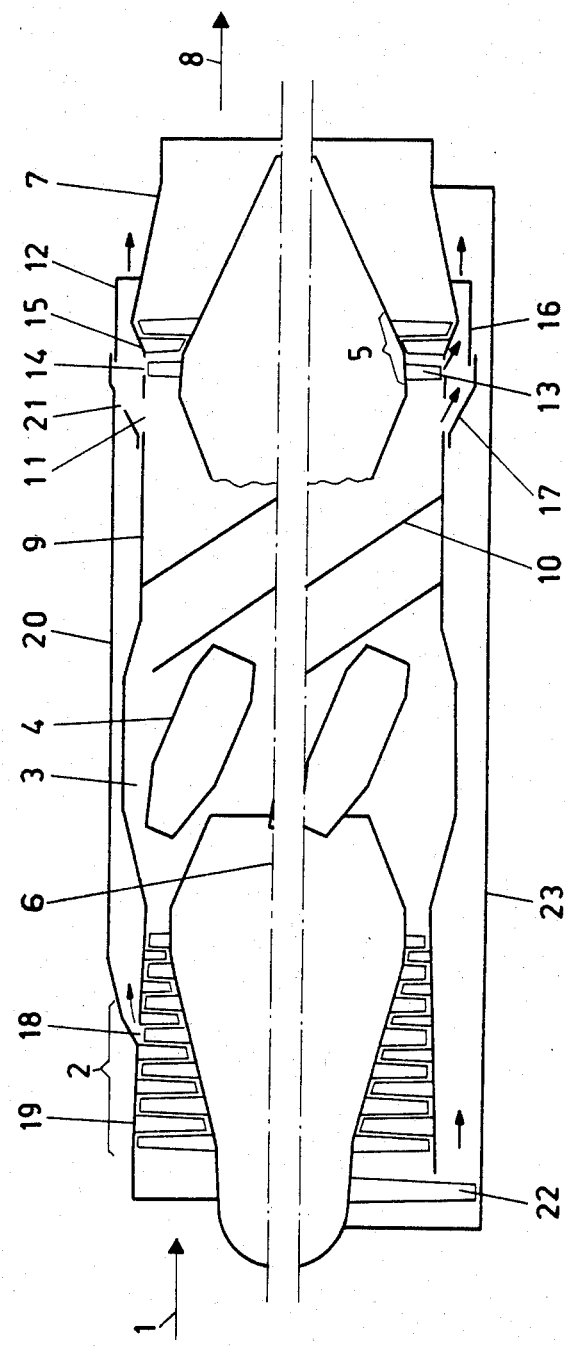

GAS TURBINE ENGINE WITH PULVERIZED COAL FIRING

This application is a division of application Ser. No. 613,023, filed May 22, 1984, now U.S. Pat. No. 4,592,199.

BACKGROUND AND OBJECTS OF THE INVENTION

The invention concerns a gas turbine engine with pulverized coal firing especially for aircraft, consisting of at least one air compressor, a combustion chamber with burners, and a gas turbine, with centrifuging of the solid combustion residues present in the combustible gas and their elimination through openings in the engine casing with the aid of a bypass flow branching off from the combustible gas.

Due to the relatively limited supply and greatly increased cost of crude oils, efforts are being made to increasingly fall back on other sources of energy.

Hydrogen would be an ideal source of energy, however, its manufacture and conversion to the liquid state ist costly and storage and transport is also difficult because of the problems of insulation. Water as a means of electricity generation which renews itself, is bound to the geographic location. The generation of electricity from atomic energy requires, at least at the present time, the construction of large power plants and necessitates highly qualified personnel for their operation.

Given these preconditions coal clearly suggests itself as a source of energy. Coal is abundantly available worldwide and easy to transport. It is known above all from its use in pure steam power plants. Experiments have already been made with pulverized coal firing in stationary gas turbine power plants, however these experiments did not lead to useful results which would have permitted industrial application.

The solid combustion residues in the combustible gas consist of unburned pulverized coal and ash and act as a kind of abrasive powder whereby the first row of turbine blades is exposed to strong erosion. The roots of the stator blades are particularly affected because of the solid particles which are thrown out due to centrifugal force.

The hot particles however stick to all surfaces coming in contact with the combustible gas, which leads to a partial clogging of the flow channels within the blading. This disadvantage has not been adequately alleviated through the addition of chemical additives.

To a certain extent this problem can be remedied by the arrangement of exit slots in the combustion chamber or gas turbine casings in order to blow out the solid residue in the combustible gas. However, in order to remove the necessary, i.e. most of the residue in the combustible gas, such a large amount of the combustible gas would have had to have been diverted for the removal of the residues that because of the high energy losses an economic operation would no longer have been possible. Thus one had to settle on a—inevitably unsatisfactory—compromise in that whilst the bypass flow from the combustible gas was kept within acceptable limits, there remained a relatively large amount of combustion residue which led to the above-mentioned erosion damage in the gas turbine blading, albeit only after a somewhat longer time span. Economic industrial operation was not possible in this manner.

Gas turbine engines with pulverized coal firing for aircraft did not proceed beyond the planning stages because of the same problems, although coal ash being a fertilizer could be widely distributed without problems by elimination through the exhaust.

The task underlying this invention was to create a gas turbine engine of the type described at the beginning which permits economic longterm operation. This problem is solved by an installation for the utilization of the energy contained in the bypass flow.

Through the provision of such an installation it is possible to remove such a large part of the solid combustion residues from the combustible gas as is necessary to avoid unduly high erosion of the gas turbine blading or even clogging of flow channels and as a result achieve long operating times. Despite the fact that a larger bypass flow is necessary than in conventional test installations through the utilization of the energy contained in the bypass flow the efficiency as a whole of the power plant is hardly affected.

The installation just mentioned is best used in aircraft in at least one thrust nozzle which is impinged upon by the bypass flow, the function of which is to augment the thrust of the main thrust nozzle of the engine: in a stationary power plant in at least one heat exchanger through which the bypass flow flows, which, for example, serves to preheat the air for combustion. In order to effect a more rapid elimination of the combustion residues through openings in the combustion chamber or gas turbine casings, it is advantageous to produce swirl of the combustible gas prior to entrance in the gas turbine blading.

BRIEF DESCRIPTION OF THE DRAWING

According to the following single FIGURE of the drawing, the two halves of which differ only in a few details, a schematically represented example of the invention will be described in greater detail, whereby auxiliary devices and mechanisms of all kinds as well as parts not significant for the invention have been omitted.

DETAILED DESCRIPTION OF PREFERRED EMBODIMENTS OF THE INVENTION

The FIGURE shows a gas turbine engine for an aircraft. The air necessary for operation flows in the direction of the arrow (1) toward the compressor (2). After compression it enters the combustion chamber (3), where it serves in part as air for combustion in the burners (4) fired with pulverized coal, and partially as a coolant for the same.

The combustible gas produced in this way now flows to the gas turbine (5), which drives the compressor (2), which have a common shaft. The energy still contained in the combustible gas after leaving the gas turbine (5) is converted into velocity in the main thrust nozzle. The exhaust gases leave the engine in the direction of the arrow (8).

In order to centrifuge out and separate the combustion residues in the combustible gas, it is necessary to set the combustible gas in the combustion chamber into rotation. For this purpose sheet metal strips (10) are arranged in a spiral form on the inner side of the combustion chamber casing (9), thereby swirl is introduced into the combustible gas. This flow diversion can be augmented by arranging the burners (4) at an angle with respect to the longitudinal axis (6) of the engine. If the air already leaves the compressor (2), with a tangential component, the additional effect of the angled burners may suffice to introduce the desired swirl into the combustible gas and the sheet metal strips can be dispensed with.

Due to the swirl the combustion residues reach the periphery of the combustion chamber (3). Through openings (11) in the combustion chamber casing (9) a layer of the rotating combustible gas containing solid particles is removed with the aid of a branched off bypass flow. These openings can, for example, be arranged as exit slots. The energy contained in the bypass flow is utilized in the thrust nozzle (12) for the generation of additional thrust. The thrust nozzle (12) can be configured as an annular nozzle or split up into several individual nozzles.

Since the combustible gas is already swirling when it reaches the blading of the gas turbine (5), a row of stator blades at the inlet is no longer necessary. Thus the combustible gas impinges upon the first row of rotor blades (13) directly. The fact that one row of blades becomes superfluous means a decrease in the length of the machine and of weight which is of particular importance for aircraft construction.

If, despite the elimination of combustion residues described above, the combustible gas should still contain fine residual particles they are moved further outward by the rotor blades (13). In order to achieve an even greater level of purity of the combustible gas, it is foreseen that openings (14) in the gas turbine casing (15) could be provided through which the remaining particles are eliminated which againt occurs with the aid of a bypass flow. For the sake of practicality both bypass flows are conducted to the thrust nozzle (12) together.

On the other hand it could also be that openings (11) in the combustion chamber casing (9) are not necessary and the openings (14) in the gas turbine casing (15) are sufficient, if—and this depends upon the properties of the pulverized coal—the combustible gas contains very small amounts of combustion residues.

The solid combustion residues which are centrifuged out act similarly to a sandblaster when they impinge upon a surface. It is therefore advantageous to design especially that part of the casing (16) where the exiting bypass flow leaves through openings (11, 14) with a radial component and is diverted toward the thrust nozzle (12) as a part subject to wear (17) which is accessible from the outside and replaceable. Above all hard steel and ceramics may be mentioned as wearresistent materials.

In principle, it is recommended to consider also those components which contain openings (11) and (14) as parts subject to wear, however, the indispensable accessibility and interchangeability may lead to greater difficulties.

In order to utilize more efficiently the heat contained in the bypass flow, it can be mixed with compressed air from the compressor part of the engine.

This can be accomplished, for example, by an intermediate stage of the compressor (2) through openings (18) in the compressor casing (19), as is shown in the upper half of the schematic diagram. The compressed air which is extracted is guided to the back along the outer casing (20) where through openings (21) it is mixed with the bypass flow containing the combustion residues. The arrangement of openings (18) and (21) is chosen to advantage in such a way that when the bypass flow and compressed air flow are combined they should have approximately the same pressure level. If the bypass flow leaves the thrust nozzle (12) unmixed, then after expansion it still has a high temperature and exit velocity. This heat loss is decreased by mixing the bypass flow with the compressed air flow. The compressed air undergoes additional heating and expansion, which results in increased thrust through the better utilization of the pressure drop, and after expansion the exit temperature of the exhaust gas is correspondingly lower than without the mixing with compressed air. In addition the exit velocity at the thrust nozzle is limited, resulting in reduced turbulence and therefore less noise pollution.

Various measures can be taken for the thorough mixing of the two flows, for example, greater dispersion of the compressed air flow as it enters the hot bypass flow, attachment of baffles, and other mixing aids. The more uniform the mixing is, the more uniform is the mixture temperature and the better the level of utilization of available energy.

A variant of the above is shown in the lower half of the figure for a dual cycle engine. The compressed air extracted after the blower (22) is guided toward the back along the outer casing (23) and mixed with the hot bypass flow. Through this heating of the compressed air after the blower similar advantages result as described previously. Also in this case the designer has the opportunity to favorably influence the pressure of the two flows when they come together and their thorough mixing through the design of the thrust nozzle (12) and the outer casing (23) or through the arrangement of pertinent auxiliary means.

The present invention can be used for stationary power plants using gas turbine drives in an analgous manner as for aircraft. In order to generate the necessary swirl of the combustible gas it is advantageous to install a spiral casing in front of the gas turbine as is known from gas turbine power plants using oil burners.

For the exit of the bypass flow with the solid combustion residues practically only openings (14) in the gas turbine casing (15) at the first row of rotor blades (13) comes into consideration. Also in this case the first row of stator blades, which is the part most endangered by corrosion, can be eliminated because of the fact that the combustible gas is already swirling.

In order to utilize the energy contained the bypass flow then flows through a heat exchanger, which because of the solid combustion residues contained in the bypass flow, the surfaces of which should be as smooth as possible. Subsequently the combustion residues must be extracted from the exhaust gas, because quantitatively the amount is too large that it could be freely released into the surrounding atmosphere.

I claim:

1. A dual cycle gas engine operable with a fuel of pulverized coal, comprising:
   an air compressor;
   a combustion chamber downstream of said air compressor, said combustion chamber including coal-fired burners at a skewed angle with respect to a longitudinal axis of said gas turbine engine and a casing having radially disposed openings in a portion of said combustion chamber casing downstream of said burners;
   an air blower upstream of said compressor and arranged to supply air flow to said compressor and a second air flow; and
   a duct communicating said second air flow with said radially disposed openings.

2. The dual cycle gas turbine engine as claimed in claim 1, wherein said combustion chamber further includes spiral strips within said combustion chamber casing and intermediate of said burners and said openings.

3. The gas turbine engine of claim 1, wherein said turbine includes a row of blades and a turbine casing having radially disposed openings adjacent said row of blades, said duct being in communication with said last-named openings.

4. The gas turbine engine of claim 2, wherein said turbine includes a row of blades and a turbine casing having radially disposed openings adjacent said row of blades, said duct being in communication with said last-named openings.

5. The gas turbine engine of claim 1, wherein said duct discharges through a nozzle to produce thrust.

* * * * *